(12) United States Patent
Wu et al.

(10) Patent No.: US 11,092,374 B2
(45) Date of Patent: Aug. 17, 2021

(54) REFRIGERATING STRUCTURE

(71) Applicant: WUYI UNIVERSITY, Jiangmen (CN)

(72) Inventors: Min Wu, Jiangmen (CN); Yan Zhou, Jiangmen (CN)

(73) Assignee: WUYI UNIVERSITY, Jiangmen (CN)

(*) Notice: Subject to any disclaimer, the term of this patent is extended or adjusted under 35 U.S.C. 154(b) by 32 days.

(21) Appl. No.: 16/389,872

(22) Filed: Apr. 19, 2019

(65) Prior Publication Data
US 2020/0292222 A1 Sep. 17, 2020

(30) Foreign Application Priority Data
Mar. 11, 2019 (CN) .......................... 201910181425.X

(51) Int. Cl.
| | |
|---|---|
| *F25D 1/02* | (2006.01) |
| *F25D 17/06* | (2006.01) |
| *F24F 5/00* | (2006.01) |
| *F24F 1/039* | (2019.01) |
| *F24F 1/02* | (2019.01) |

(52) U.S. Cl.
CPC .............. *F25D 1/02* (2013.01); *F25D 17/062* (2013.01); *F24F 1/02* (2013.01); *F24F 1/039* (2019.02); *F24F 5/0046* (2013.01); *F24F 2005/0053* (2013.01)

(58) Field of Classification Search
CPC ............. F24F 5/0046; F24F 2005/0053; F24F 2005/006; F24F 1/02; F24F 1/039; F25D 1/02; F25D 17/062; Y02B 30/54; Y02B 10/40
See application file for complete search history.

(56) References Cited

U.S. PATENT DOCUMENTS

| | | | | |
|---|---|---|---|---|
| 1,898,603 A | * | 2/1933 | Stubkjare .................. | F25D 1/02 261/104 |
| 2,777,677 A | * | 1/1957 | Bunch ....................... | F24F 3/14 261/158 |
| 5,606,865 A | * | 3/1997 | Caron ....................... | F25D 1/02 62/238.1 |
| 6,568,202 B1 | * | 5/2003 | Hodges ..................... | F24F 1/02 261/121.1 |
| 9,664,398 B2 | * | 5/2017 | DeVore ................. | F24F 5/0046 |

* cited by examiner

*Primary Examiner* — Joseph F Trpisovsky
(74) *Attorney, Agent, or Firm* — Kolitch Romano LLP

(57) ABSTRACT

A refrigerating structure may include an air inlet mechanism, a water tank, and an air outlet mechanism. The air inlet mechanism introduces hot air from a room into the water tank, and comprises a first fan, an air inlet channel, an air inlet pipe and an air pump. The first fan is arranged in the air inlet channel. The air inlet pipe is extended into a bottom of the water tank, and the air pump is arranged at one end of the air inlet pipe extended into the water tank. The water tank is provided with a water inlet pipe and a water discharge pipe communicated with seawater or underground water. The water inlet pipe is arranged at an upper part of the water tank, the upper part of the water tank is open. The air outlet mechanism discharges cold air in the water tank into the room.

17 Claims, 2 Drawing Sheets

REFRIGERATING STRUCTURE

FIELD

This disclosure relates to systems and methods for air conditioning. More specifically, the disclosed embodiments relate to a refrigerating structure.

INTRODUCTION

At present, a general building air conditioner relies on a compressor to compress a refrigerant for the purpose of refrigeration, resulting in particularly high energy consumption.

SUMMARY

The present disclosure is intended to solve one of the technical problems above in related art to some extent. Therefore, the present disclosure provides a refrigerating structure with reduced energy consumption.

The technical solution according to the present disclosure is described as follows.

In some embodiments, a refrigerating structure may include an air inlet means, a water tank, and an air outlet means, wherein the air inlet means introduces indoor hot air into the water tank, and comprises a first fan, an air inlet channel, an air inlet pipe, and an air pump; the first fan is arranged in the air inlet channel, the air inlet pipe is communicated with the air inlet channel, the air inlet pipe is extended into a bottom of the water tank, and the air pump is arranged at one end of the air inlet pipe extended into the water tank; the water tank is provided with a water inlet pipe and a water discharge pipe communicated with seawater or underground water, the water inlet pipe is arranged at an upper part of the water tank, the upper part of the water tank is open, and the water discharge pipe is arranged at a side wall of the water tank; and the air outlet means is communicated with the water tank and discharges cold air in the water tank out of the room, and the air outlet means is arranged above the water discharge pipe.

The refrigerating structure may further comprise a cabinet, wherein the cabinet is provided with an air inlet, the cabinet is internally provided with a baffle plate, a space below the baffle plate is the air inlet channel, the air inlet is arranged below the baffle plate. The air inlet pipe, the water tank and the air outlet means are all arranged above the baffle plate. The baffle plate is provided with an air supply pipe, and the air supply pipe is communicated with the air inlet pipe.

Further, an upper surface of the air pump may be provided with a plurality of air outlet holes.

Further, the cabinet may be provided with an air outlet, and the air outlet means is arranged between the water tank and the air outlet, and leads cold air in the water tank out of the air outlet to the outside.

Further, the air outlet means may include an air inlet pipe, an air tank and a second fan; and the air inlet pipe may be arranged between the air tank and the water tank and communicate the air tank with the water tank. The second fan may be arranged in the air tank.

Further, the air inlet pipe may include a main air inlet pipe and a plurality of branch air inlet pipes. The main air inlet pipe may be communicated with the air supply pipe. The plurality of branch air inlet pipes are inserted into the water tank, and tail ends of the plurality of branch air inlet pipes are all provided with an air pump.

Further, the air tank may also be internally provided with a filter screen dividing the air tank into two spaces. In these examples, the second fan is arranged on one side of the filter screen close to the air outlet.

Further, the air tank may also be provided with a return pipe for returning water into the water tank, and the return pipe is arranged on one side of the filter screen close to the air inlet pipe.

The present disclosure has the beneficial effects that hot air is directly cooled by a natural water source, e.g., seawater or underground water in nature, the hot air is directly introduced into cold seawater or underground water for cooling, only a small-power air pump is needed for extracting the hot air, and a compressor is unnecessary, thus greatly reducing energy consumption of the whole equipment. Features, functions, and advantages may be achieved independently in various embodiments of the present disclosure, or may be combined in yet other embodiments, further details of which can be seen with reference to the following description and drawings.

DETAILED DESCRIPTION

Various aspects and examples of a refrigerating structure, as well as related methods, are described below and illustrated in the associated drawings. Unless otherwise specified, a refrigerating structure in accordance with the present teachings, and/or its various components, may contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

Figure 1:
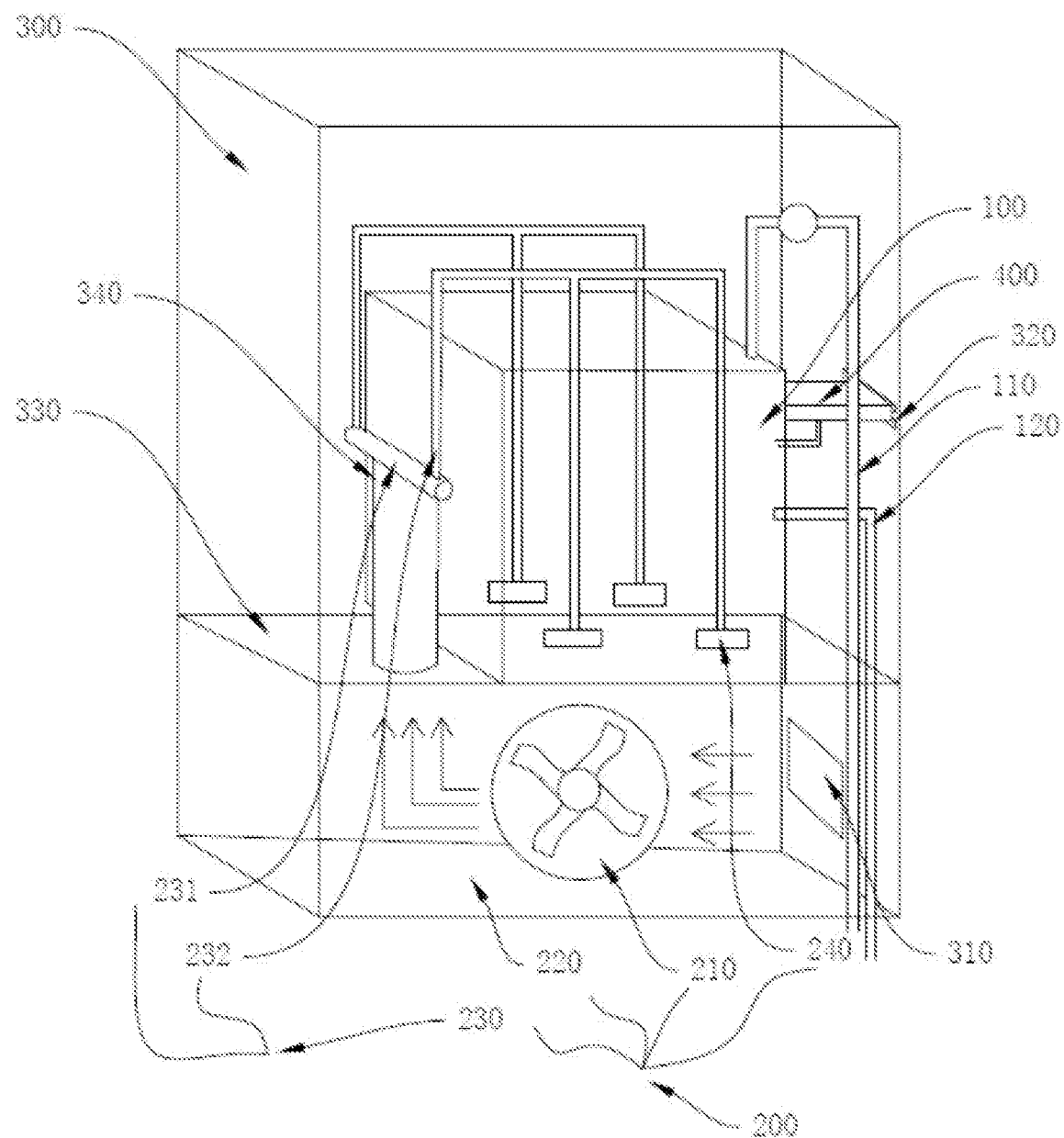
FIG. 1 is a diagram of a mounting structure of the present disclosure.
Figure 2:
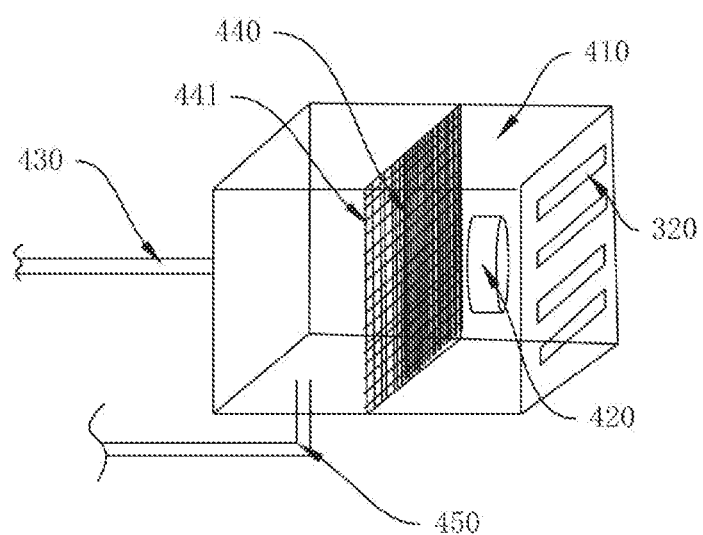
FIG. 2 is a diagram of a mounting structure of an air outlet means in the present disclosure.

Turning now to the drawings, with reference to FIG. 1 to FIG. 2, a refrigerating structure comprises an air inlet means 200, a water tank 100, and an air outlet means 400, wherein the air inlet means 200 introduces hot air into the water tank 100. In this context, "hot air" refers to air (e.g., from a room or space) which is warmer than desired. The air inlet means 200 further comprises a first fan 210, an air inlet channel 220, an air inlet pipe 230, and an air pump 240. The first fan 210 is arranged in the air inlet channel 220. The air inlet pipe 230 is communicated with the air inlet channel 220. The air inlet pipe 230 is extended into a bottom of the water tank 100. The air pump 240 is arranged at one end of the air inlet pipe 230 extended into the water tank 100. The water tank 100 is provided with a water inlet pipe 110 and a water discharge pipe 120 communicated with seawater or underground water and/or any suitable source of water having a cooler temperature relative to the hot air, e.g., a natural water source. The water inlet pipe 110 is arranged at an upper part of the water tank 100, the upper part of the water tank 100 is open, and the water discharge pipe 120 is arranged at a side wall of the water tank 100. The air outlet means 400 is communicated with the water tank 100 and discharges cold air in the water tank 100 out of the room. In this context, "cold air" refers to air that is cooler relative to the hot air. The air outlet means 400 is arranged above the water discharge pipe 120.

The hot air enters the air inlet channel driven by the first fan 210 and enters the water tank 100 along the air inlet pipe 230 under the action of the air pump(s) 240. The seawater or the underground water is stored in the water tank 100. The hot air is cooled by the seawater or the underground water with a temperature much lower than the air. The cooled air can form bubbles in the seawater or the underground water, when the bubbles burst, the cooled air is released, and the continuously formed cold air is led out to the outside under the action of the air outlet means 400 to complete the whole cooling process.

It shall be mentioned that when the hot air enters the water tank 100, the hot air can be fully contacted with the seawater or the underground water, so as to increase a contact area between the air and the seawater or the underground water, improve a heat exchange efficiency, and fully cool the hot air.

The seawater or the underground water can be heated while cooling the hot air, the heated seawater or underground water can rise to a water surface in the water tank 100, the water surface can rise to a position where the water discharge pipe 120 is located, and the heated seawater or underground water returns to the sea again through the water discharge pipe 120. Meanwhile, the seawater or the underground water can enter the water tank 100 through the water inlet pipe 110, and preferably, a water pump is arranged in the water inlet pipe 110 to continuously input the seawater or the underground water into the water tank 100, so as to realize the circulation of the seawater or the underground water, and ensure that the seawater or the underground water in the water tank 100 remains a low temperature and continuously cool the hot air.

The seawater or the underground water in nature is used to directly cool the hot air, and only a low-power air pump 240 is needed to extract the hot air, which is about 12 W to 15 W, thus greatly reducing the energy consumption of the whole equipment.

In an embodiment, the refrigerating structure further comprises a cabinet 300, wherein the cabinet 300 is provided with an air inlet 310. The cabinet 300 is internally provided with a baffle plate 330. A space below the baffle plate 330 is the air inlet channel 220. The air inlet 310 is arranged below the baffle plate 330. The air inlet pipe 230, the water tank 100, and the air outlet means 400 are all arranged above the baffle plate 330. The baffle plate 330 is provided with an air supply pipe 340, and the air supply pipe 340 is communicated with the air inlet pipe. The whole structure is vertically designed, which is convenient for mounting.

In an embodiment, an upper surface of the air pump 240 is provided with a plurality of air outlet holes. After the air pump 240 extracts the hot air from the air inlet pipe, the hot air enters the water tank 100 through the air outlet holes for cooling, which conforms to a movement direction of the hot air, so as to be convenient for the hot air to enter the water tank 100.

In some embodiments, the cabinet 300 is provided with an air outlet 320, and the air outlet means 400 is arranged between the water tank 100 and the air outlet 320 and leads cold air in the water tank 100 out of the air outlet 320 to the outside.

With reference to FIG. 2, in some embodiments, the air outlet means 400 comprises an air inlet pipe 430, an air tank 410, and a second fan 420. The air inlet pipe 430 is arranged between the air tank 410 and the water tank 100 to communicate the air tank 410 with the water tank 100. The second fan 420 is arranged in the air tank 410.

The second fan 420 is used to extract the cold air, so that the cooled cold air can enter the air tank 410 through the air inlet pipe 430 and finally be discharged to the outside through the air outlet 320.

In some embodiments, the air inlet pipe 230 comprises a main air inlet pipe 231 and a plurality of branch air inlet pipes 232 (see FIG. 1). The main air inlet pipe 231 is communicated with the air supply pipe 340. The plurality of branch air inlet pipes 232 are inserted into the water tank 100. The ends of the plurality of branch air inlet pipes 232 are all provided with an air pump 240. A large amount of the hot air is received through the main air inlet pipe 231 and diverted into the water tank 100 to improve the cooling efficiency.

In some embodiments, the air tank 410 is also internally provided with a filter screen 440 dividing the air tank 410 into two spaces (see FIG. 2). The second fan 420 is arranged on one side of the filter screen 440 close to the air outlet 320.

Preferably, the filter screen 440 is provided with a plurality of square screen holes 441 with a side length less than or equal to 0.5 cm. The diameter of a water drop is generally about 0.62 cm. Accordingly, the screen hole 441 can effectively block the water drops and water in the cold air may be trapped in the air tank 410.

In some embodiments, the air tank 410 is also provided with a return pipe 450 for returning water into the water tank 100, and the return pipe 450 is arranged on one side of the filter screen 440 close to the air inlet pipe 430 (see FIG. 2).

The water left in the air tank 410 needs to be treated regularly, which is inconvenient. The air tank 410 is internally provided with the return pipe 450 to enable the water to re-enter the water tank 100, which is convenient for treatment.

Additional aspects and features of refrigeration structures in accordance with aspects of the present disclosure, are presented below without limitation as a series of paragraphs, some or all of which may be alphanumerically designated for clarity and efficiency. Each of these paragraphs can be combined with one or more other paragraphs, and/or with disclosure from elsewhere in this application, in any suitable manner. Some of the paragraphs below expressly refer to and further limit other paragraphs, providing without limitation examples of some of the suitable combinations.

A0. A refrigerating structure, comprising a water tank having a water inlet pipe and a water discharge pipe communicated with seawater or underground water, an air inlet means for introducing hot air into the water tank, and an air outlet means for discharging cold air in the water tank out of the room, wherein:

the air inlet means comprises a first fan, an air inlet channel, an air inlet pipe and an air pump;

the first fan is arranged in the air inlet channel, the air inlet pipe is communicated with the air inlet channel, the air inlet pipe is extended into a bottom of the water tank, and the air pump is arranged at one end of the air inlet pipe extended into the water tank;

the water inlet pipe is arranged at an upper part of the water tank, the upper part of the water tank is open, and the water discharge pipe is arranged at a side wall of the water tank; and the air outlet means outlet means is arranged above the water discharge pipe.

A1. The refrigerating structure according to A0, further comprising a cabinet, wherein: the cabinet is provided with an air inlet; the cabinet is internally provided with a baffle plate; a space below the baffle plate is an air inlet channel; the air inlet is arranged below the baffle plate, the air inlet pipe, the water tank and the air outlet means are all arranged above the baffle plate; the baffle plate is provided with an air supply pipe; and the air supply pipe is communicated with the air inlet pipe.

A2. The refrigerating structure according to A0 or A1, wherein an upper surface of the air pump is provided with a plurality of air outlet holes.

A3. The refrigerating structure according to A1, wherein an upper surface of the air pump is provided with a plurality of air outlet holes.

A4. The refrigerating structure according to A1, wherein the cabinet is provided with an air outlet, and the air outlet means is arranged between the water tank and the air outlet to lead cold air in the water tank out of the air outlet to outside.

A5. The refrigerating structure according to A1, wherein: the air inlet pipe comprises a main air inlet pipe and a plurality of branch air inlet pipes; the main air inlet pipe is communicated with the air supply pipe; the plurality of branch air inlet pipes are inserted into the water tank; and ends of the plurality of branch air inlet pipes are all provided with an air pump.

A6. The refrigerating structure according to any one of paragraphs A0 through A5, wherein: the air outlet means comprises an air inlet pipe, an air tank and a second fan; the air inlet pipe is arranged between the air tank and the water tank to communicates the air tank with the water tank; and the second fan is arranged in the air tank.

A7. The refrigerating structure according to A6, wherein: the air tank is also internally provided with a filter screen; the filter screen divides the air tank into two spaces; and the second fan is arranged on one side of the filter screen close to the air outlet.

A8. The refrigerating structure according to A7, wherein the air tank is also provided with a return pipe for returning water into the water tank, and the return pipe is arranged on one side of the filter screen close to the air inlet pipe.

Conclusion

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A refrigerating structure, comprising:
    a water tank having a water discharge pipe, and a water inlet pipe in communication with a water source;
    an air inlet means for introducing hot air from a room into the water tank; and
    an air outlet means for discharging cold air from the water tank into the room;
    wherein:
    the air inlet means comprises a first fan, an air inlet channel, a first air inlet pipe, and a first air pump;
    the first fan is arranged in the air inlet channel, the first air inlet pipe is communicated with the air inlet channel, the first air inlet pipe is extended into a bottom of the water tank, and the first air pump is arranged at one end of the first air inlet pipe extended into the water tank;
    the water inlet pipe is arranged at an upper part of the water tank, the upper part of the water tank is open, and the water discharge pipe is arranged at a side wall of the water tank; and
    the air outlet means is arranged above the water discharge pipe.

2. The refrigerating structure according to claim 1, further comprising a cabinet, wherein:
    the cabinet includes an air inlet and an internal baffle plate;
    the air inlet channel is arranged below the baffle plate;
    the air inlet is arranged below the baffle plate;
    the first air inlet pipe, the water tank, and the air outlet means are all arranged above the baffle plate; and
    the baffle plate has an air supply pipe in communication with the first air inlet pipe.

3. The refrigerating structure according to claim 2, wherein the cabinet comprises an air outlet opening, and the air outlet means is arranged between the water tank and the air outlet opening to lead cold air in the water tank out of the air outlet opening and into the room.

4. The refrigerating structure according to claim 3, wherein:
    the air outlet means comprises a second air inlet pipe, an air tank, and a second fan;
    the second air inlet pipe is arranged between the air tank and the water tank to communicate the air tank with the water tank; and
    the second fan is arranged in the air tank.

5. The refrigerating structure according to claim 2, wherein:
    the first air inlet pipe comprises a main air inlet pipe in communication with a plurality of branch air inlet pipes;
    the main air inlet pipe is communicated with the air supply pipe;
    the plurality of branch air inlet pipes are inserted into the water tank; and
    ends of the plurality of branch air inlet pipes are each provided with a respective one of a plurality of second air pumps.

6. The refrigerating structure according to claim 5, wherein:
    the air outlet means comprises a second air inlet pipe, an air tank, and a second fan;
    the second air inlet pipe is arranged between the air tank and the water tank to communicate the air tank with the water tank; and
    the second fan is arranged in the air tank.

7. The refrigerating structure according to claim 6, wherein:
the air tank further comprises an internal filter screen;
the filter screen divides the air tank into two spaces; and
the second fan is arranged on one side of the filter screen.

8. The refrigerating structure according to claim 7, wherein the air tank further comprises a return pipe configured to return water into the water tank, and the return pipe is arranged on one side of the filter screen adjacent the second air inlet pipe.

9. The refrigerating structure according to claim 2, wherein:
the air outlet means comprises a second air inlet pipe, an air tank, and a second fan;
the second air inlet pipe is arranged between the air tank and the water tank to communicate the air tank with the water tank; and
the second fan is arranged in the air tank.

10. The refrigerating structure according to claim 1, wherein:
the air outlet means comprises a second air inlet pipe, an air tank, and a second fan;
the second air inlet pipe is arranged between the air tank and the water tank to communicate the air tank with the water tank; and
the second fan is arranged in the air tank.

11. A refrigerating structure, comprising:
a water tank having a water discharge pipe, and a water inlet pipe in communication with a water source, wherein the water inlet pipe is arranged at an upper part of the water tank, the upper part of the water tank is open, and the water discharge pipe is arranged at a side wall of the water tank;
a first fan arranged in an air inlet channel in communication with a first air inlet pipe extended into a bottom of the water tank, and a first air pump arranged at one end of the first air inlet pipe extended into the water tank, such that hot air from a room is introduced into the water tank; and
an air outlet arranged above the water discharge pipe and configured to discharge cold air from the water tank into the room.

12. The refrigerating structure according to claim 11, further comprising a cabinet, wherein:
the cabinet includes an air inlet and an internal baffle plate;
the air inlet channel is arranged below the baffle plate;
the air inlet is arranged below the baffle plate;
the first air inlet pipe, the water tank, and the air outlet are all arranged above the baffle plate; and
the baffle plate has an air supply pipe in communication with the first air inlet pipe.

13. The refrigerating structure according to claim 12, wherein the cabinet comprises an air outlet opening, and the air outlet is arranged between the water tank and the air outlet opening to lead cold air in the water tank out of the air outlet opening and into the room.

14. The refrigerating structure according to claim 12, wherein:
the first air inlet pipe comprises a main air inlet pipe in communication with a plurality of branch air inlet pipes;
the main air inlet pipe is communicated with the air supply pipe;
the plurality of branch air inlet pipes are inserted into the water tank; and
ends of the plurality of branch air inlet pipes are each provided with a respective one of a plurality of second air pumps.

15. The refrigerating structure according to claim 11, wherein:
the air outlet comprises a second air inlet pipe, an air tank, and a second fan;
the second air inlet pipe is arranged between the air tank and the water tank to communicate the air tank with the water tank; and
the second fan is arranged in the air tank.

16. The refrigerating structure according to claim 15, wherein:
the air tank further comprises an internal filter screen;
the filter screen divides the air tank into two spaces; and
the second fan is arranged on one side of the filter screen.

17. The refrigerating structure according to claim 16, wherein the air tank further comprises a return pipe configured to return water into the water tank, and the return pipe is arranged on one side of the filter screen adjacent the second air inlet pipe.

* * * * *